United States Patent
Li et al.

(10) Patent No.: US 10,769,615 B2
(45) Date of Patent: *Sep. 8, 2020

(54) DEVICE AND METHOD IN WIRELESS COMMUNICATION SYSTEM AND WIRELESS COMMUNICATION SYSTEM

(71) Applicant: Sony Corporation, Tokyo (JP)

(72) Inventors: Ji Li, Beijing (CN); Zhihui Zhang, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/297,746

(22) Filed: Mar. 11, 2019

(65) Prior Publication Data
US 2019/0205864 A1 Jul. 4, 2019

Related U.S. Application Data

(63) Continuation of application No. 15/215,988, filed on Jul. 12, 2016, now Pat. No. 10,304,046.

(30) Foreign Application Priority Data

Aug. 7, 2015 (CN) .......................... 2015 1 0483823

(51) Int. Cl.
*G06Q 20/32* (2012.01)
*H04W 12/04* (2009.01)
(Continued)

(52) U.S. Cl.
CPC ....... *G06Q 20/3224* (2013.01); *G06Q 20/382* (2013.01); *G06Q 20/4016* (2013.01);
(Continued)

(58) Field of Classification Search
CPC . G06Q 20/3224; G06Q 2220/00; H04W 4/38; H04W 12/04; H04W 76/14; H04W 4/21
See application file for complete search history.

(56) References Cited

U.S. PATENT DOCUMENTS

| 2009/0144161 A1 | 6/2009 | Fisher |
| 2013/0290696 A1 | 10/2013 | Broustis et al. |

(Continued)

FOREIGN PATENT DOCUMENTS

| CN | 102932382 A | 2/2013 |
| CN | 104012012 A | 8/2014 |

(Continued)

OTHER PUBLICATIONS

3rd Generation Partnership Project; Technical Specification Group Services and System Aspects; Proximity-based Services (Prose); Security aspects (Release 12), Dec. 2014, 3GPP V12.2.2 (Year: 2014).

(Continued)

*Primary Examiner* — Christopher C Harris
(74) *Attorney, Agent, or Firm* — Xsensus LLP

(57) ABSTRACT

There is disclosed a device and method in a wireless communication system and a wireless communication system, the device including: a secure channel establishing unit configured to establish a secure communication channel between a first apparatus and a second apparatus using a location-based service; a data security key generating unit configured to generate a data security key for protecting service data based on at least a channel key extracted from the secure communication channel; and a controlling unit configured to control the service data protected using the data security key to be transmitted on the secure communication channel. According to the embodiments of the disclosure, it is possible to improve security of data transmission.

22 Claims, 16 Drawing Sheets

(51) Int. Cl.
  *H04W 4/38* (2018.01)
  *G06Q 20/40* (2012.01)
  *G06Q 20/38* (2012.01)
  *H04W 76/14* (2018.01)
  *H04W 4/21* (2018.01)
  *H04W 12/00* (2009.01)

(52) U.S. Cl.
  CPC .............. *H04W 4/38* (2018.02); *H04W 12/04* (2013.01); *G06Q 2220/00* (2013.01); *H04W 4/21* (2018.02); *H04W 12/00503* (2019.01); *H04W 76/14* (2018.02)

(56) References Cited

U.S. PATENT DOCUMENTS

| | | |
|---|---|---|
| 2014/0033288 A1 | 1/2014 | Wynn et al. |
| 2014/0196113 A1 | 7/2014 | Chen et al. |
| 2014/0237559 A1 | 8/2014 | Zhang et al. |
| 2015/0305070 A1 | 10/2015 | Ahmad |
| 2016/0205555 A1 | 7/2016 | Agiwal et al. |

FOREIGN PATENT DOCUMENTS

| | | |
|---|---|---|
| CN | 104662997 A | 5/2015 |
| DE | 102013201730 A1 | 8/2014 |
| EP | 0773647 A2 | 5/1997 |
| WO | 2014/071140 A2 | 5/2014 |

OTHER PUBLICATIONS

Universal Mobile Telecommunications System (UMTS); LTE; Proximity-based services (Prose); Stage 2 (3GPP TS 23.303 version 12.2.0 Release 12), Sep. 2014, 3GPP V12.2.2 (Year: 2014).

Konstantin Hypponen"Open Mobile Identity, Secure Identity Management and Mobile Payments Using Hand-Held Devices", Doctoral Dissertation, University of Kuopio, 2009, 80 pages.

Office Action dated Apr. 29, 2020 in Chinese Patent Application No. 201510483823.9, 9 pages.

3GPP TS 33.303 V13.0.0 (2015-06), Technical Specification; 3rd Generation Partnership Project; Technical Specification Group Services and System Aspects; Proximity-based Services (ProSe); Security aspects (Release 13), Jun. 30, 2015, 65 pages.

DEVICE AND METHOD IN WIRELESS COMMUNICATION SYSTEM AND WIRELESS COMMUNICATION SYSTEM

CROSS-REFERENCE TO RELATED APPLICATIONS

This application is a continuation of U.S. patent application Ser. No. 15/215,988, filed Jul. 21, 2016, which claims priority to CN 201510483823.9, filed Aug. 7, 2015, the entire contents of which are incorporated herein by reference.

FIELD OF THE INVENTION

The present disclosure relates to a device and method in a wireless communication system and a wireless communication system, and more particularly, to a device and method in a wireless communication system and a wireless communication system which are capable of realizing secure data transmission using a location-based service.

BACKGROUND OF THE INVENTION

In recent years, with the development of mobile communication technology, the location-based service such as Proximity-based Service (ProSe) of 3GPP has been widely applied in various application fields such as navigation, information push, mobile payment and the like, so as to provide better convenience for users. Further, existing wireless data transmission using the location-based service may be generally established on Near Field Communication (NFC), Bluetooth or wireless LAN (WiFi) channels. Security of a wireless communication system may be guaranteed by related communication protocols, applications or the like and is independent from the channel. Further, initialization of security parameters of the wireless communication system usually needs an additional third party secure channel, which increases complexity of an application system. In the current wireless communication system, in order to guarantee the secure data transmission, it is generally considered how to verify account information of an apparatus at one end of communication or only an apparatus at one end is verified, while for an apparatus at other end of the communication, there is no valid verification. As such, the apparatus at one end may face a risk of being attacked by a vicious third party apparatus. On the other hand, the NFC, Bluetooth or WiFi channels or the like lack dedicated security protection, and thus in system design which is based on these channels but data security of which is independent from the channels, a physical channel generally becomes an attack point that an attacker attacks the wireless communication system.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problems, an object of the disclosure is to provide a device and method in a wireless communication system and a wireless communication system which are capable of realizing secure data transmission on a secure communication channel established using location-based service, and which avoid or at least reduce system insecurity due to independence of data security from channel in prior art.

According to one aspect of the disclosure, there is provided a device in a wireless communication system, the device may include: a secure channel establishing unit configured to establish a secure communication channel between a first apparatus and a second apparatus using a location-based service; a data security key generating unit configured to generate a data security key for protecting service data based on at least a channel key extracted from the secure communication channel; and a controlling unit configured to control the service data protected using the data security key to be transmitted on the secure communication channel.

According to a preferred embodiment of the disclosure, the device may further include: a service classification parameter generating unit configured to generate a service classification parameter based on a type of the service data, wherein the service classification parameter comprises one or more of an algorithm for generating the data security key and a key length of the data security key. Preferably, the data security key generating unit may be further configured to generate the data security key based on the service classification parameter.

According to another preferred embodiment of the disclosure, the service classification parameter generating unit may be further configured to generate the service classification parameter based on a security parameter related to the service data.

According to another preferred embodiment of the disclosure, the security parameter may include at least one of a use frequency and a risk value.

According to another preferred embodiment of the disclosure, the service classification parameter generating unit may be further configured to generate the service classification parameter based on additional authentication.

According to another preferred embodiment of the disclosure, the data security key may include one or more of a verification key protecting verifiability, an encryption and decryption key protecting data confidentiality and an integrity key protecting data integrity.

According to another preferred embodiment of the disclosure, the device may be on the first apparatus side, and the device may further include: a requesting unit configured to send a connection request to a corresponding second apparatus among a plurality of second apparatuses based on location information, wherein the secure channel establishing unit is further configured to establish the secure communication channel according to a response to the connection request of the corresponding second apparatus.

According to another preferred embodiment of the disclosure, the requesting unit may be further configured to reselect, according to a predetermined triggering condition, the corresponding second apparatus from the plurality of second apparatuses based on the location information to send the connection request.

According to another preferred embodiment of the disclosure, the requesting unit may be further configured to select, according to a preset forbiddance list, the corresponding second apparatus from the plurality of second apparatuses to send the connection request.

According to another preferred embodiment of the disclosure, the requesting unit may be further configured to select, according to a rewarding service set by the second apparatus in advance, the corresponding second apparatus from the plurality of second apparatuses to send the connection request.

According to another preferred embodiment of the disclosure, the type of the service data may be classified according to information sensitivity or information privacy.

According to another preferred embodiment of the disclosure, the type of the service data may include payment data.

According to another preferred embodiment of the disclosure, the first apparatus may be a mobile payment client, and the second apparatus may be a mobile payment server.

According to another preferred embodiment of the disclosure, the location-based service may be Proximity-based Service (ProSe).

According to another preferred embodiment of the disclosure, the channel key may be a ProSe traffic key (PTK).

According to another preferred embodiment of the disclosure, the data security key generating unit may be further configured to generate the data security key according to apparatus information of the first apparatus and the second apparatus.

According to another preferred embodiment of the disclosure, the channel key may be a WiFi key.

According to another preferred embodiment of the disclosure, the data security key generating unit may be further configured to generate the data security key according to a Service Set ID (SSID).

According to another aspect of the disclosure, there is also disclosed a device in a wireless communication system, the device may include: a secure channel establishing unit configured to establish, in response to a connection request from a first apparatus, a secure communication channel between the first apparatus and a second apparatus using a location-based service; and a controlling unit configured to control service data protected using a data security key to be transmitted on the secure communication channel, wherein the data security key is generated by the first apparatus according to at least a channel key extracted from the secure communication channel.

According to another aspect of the disclosure, there is also disclosed a wireless communication system including: a first apparatus configured to: establish a secure communication channel with a second apparatus using a location-based service, generate a data security key for protecting service data based on at least a channel key extracted from the secure communication channel, and control the service data protected using the data security key to be transmitted on the secure communication channel; and the second apparatus configured to: establish, in response to a connection request from the first apparatus, the secure communication channel with the first apparatus using the location-based service, and control the service data protected using the data security key to be transmitted on the secure communication channel.

According to another aspect of the disclosure, there is also disclosed a method in a wireless communication system, the method may include: a secure channel establishing step of establishing a secure communication channel between a first apparatus and a second apparatus using a location-based service; a data security key generating step of generating a data security key for protecting service data based on at least a channel key extracted from the secure communication channel; and a controlling step of controlling the service data protected using the data security key to be transmitted on the secure communication channel.

According to another aspect of the disclosure, there is also disclosed a method in a wireless communication system, the method may include: a secure channel establishing step of establishing, in response to a connection request from a first apparatus, a secure communication channel between the first apparatus and a second apparatus using a location-based service; and a controlling step of controlling service data protected using a data security key to be transmitted on the secure communication channel, wherein the data security key is generated by the first apparatus according to at least a channel key extracted from the secure communication channel.

According to another aspect of the disclosure, there is also provided an electronic apparatus which may include one or more processors, in which the one or more processors may be configured to perform the method or functions of corresponding units in the wireless communication system according to the disclosure as described above.

According to other aspects of the disclosure, there is also provided computer program codes and computer program products implementing the above method according to the disclosure and computer readable storage medium on which the computer program codes implementing the above method according to the disclosure are recorded.

According to the embodiments of the disclosure, it is possible to realize secure data transmission on the secure communication channel established using the location-based service, thereby improving security and privacy of the data transmission.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE INVENTION

Figure 1:
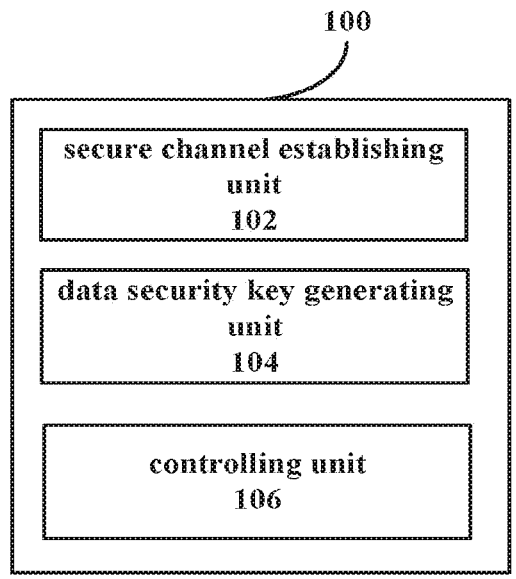
FIG. 1 is a block diagram illustrating an example of functional configuration of a device in a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Next, embodiments of the disclosure will be described in detail with reference to FIGS. 1-22.

First, an example of functional configuration of a device in a wireless communication system according to an embodiment of the disclosure will be described with reference to FIG. 1. FIG. 1 is a block diagram illustrating an example of functional configuration of a device in a wireless communication system according to an embodiment of the disclosure.

As shown in FIG. 1, a device 100 according to this embodiment may include a secure channel establishing unit 102, a data security key generating unit 104 and a controlling unit 106. An example of functional configuration of each of the units will be described in detail below.

The secure channel establishing unit 102 may be configured to establish a secure communication channel between a first apparatus and a second apparatus using location-based service. Specifically, the secure channel establishing unit 102 may utilize for example Proximity-based Service (ProSe) of 3GPP to establish the secure communication channel between the first apparatus and the second apparatus. According to the Proximity-based Service (ProSe) of 3GPP, since bi-directional authentication between two apparatuses have been completed while the connection is being established (such bi-directional authentication may also be assisted by a service provider providing location information as a third party), it can be deemed that a secure communication channel is established between the first apparatus and the second apparatus.

Below, how to utilize the location-based service to establish the secure communication channel and complete the bi-directional authentication between apparatuses in prior art will be introduced briefly. As an example, description will be made by taking the ProSe as an example. Device-to-Device (D2D) communication based on cellular network, in other words, ProSe, means that user data may be transmitted directly between terminals without network relay, avoiding the user data from being transmitted through network relay in cellular communication. ProSe utilizes radio technologies such as LTE Direct or WiFi Direct to enable different devices to directly communicate with one another, without connecting to a back-end base station, which may significantly reduce load on the core network. First, an apparatus utilizes ProSe Direct Discovery function to search for nearby services (eating and drinking, restaurants or the like) or all surrounding users within a certain service (for example, surrounding online users within the same social network) or the like. Next, the user equipment and the ProSe function use the Authentication and Key Agreement (AKA) protocol to authenticate one another. The AKA protocol is a security specification proposed by the international mobile telecommunication organization 3GPP with respect to security requirements of 3G (the third generation mobile communication network) access domain on the basis of study on security vulnerability of 2G (the second generation mobile communication network). AKA utilizes a challenge-response mechanism to complete identity authentication between the user equipment and the network, while making negotiation for a communication data security key based on the identity authentication. Further, a standard of 3GPP ProSe has defined various keys for establishing secure communication, such as ProSe Group Key (PGK), ProSe Traffic Key (PTK) or the like. For example, PGK may be configured into the apparatus by initial configuration or by proximity communication key management function and can be used to derive the PTK, which can be used to protect the data in the communication channel. Of course, it is also possible to use ProSe Encryption Key (PEK) which is derived from the PTK to protect the communication channel. At this time, the communication channel can be deemed as a secure communication channel. Of course, according to the definition of 3GPP, the PGK has a valid period, that is to say, the PGK needs to be updated, and at each time of updating, the PTK and PEK corresponding to the original PGK need to be deleted and re-derived. This updating mechanism is irrelevant to this invention, and thus no detailed description will be made herein.

The data security key generating unit 104 may be configured to generate a data security key for protecting service data based on at least a channel key extracted from the secure communication channel.

Specifically, the channel key extracted from the established secure communication channel is generated through channel secure communication protocol and is known to only the first and second apparatuses, therefore, taking the protection of data security into consideration, the data security key for protecting the service data transmitted between the first apparatus and the second apparatus may be generated according to the channel key by utilizing a predetermined data security key generation algorithm. For example, in a case that the location-based service is ProSe, the channel key may be the PTK, and the data security key generation algorithm may be for example a KDF algorithm recommended by NIST Special Publication 800-108 or the like. Data security protection may utilize existing known encryption algorithms such as symmetric algorithm, asymmetric algorithm, sequence password, identity based password or the like, and no limitation will be made herein. Further, preferably, this data security key may include one or more of a verification key protecting verifiability, an encryption and decryption key protecting data confidentiality and an integrity key protecting data integrity, which may be set according to requirements of actual applications, and no limitation will be made herein.

Further, preferably, the data security key generating unit 104 may be further configured to generate the data security key according to apparatus information of the first and second apparatuses. The apparatus information may be for example a unique identifier allocated to the secure communication between the apparatuses by the service provider providing the location information, which is used to uniquely identify the secure communication between the apparatuses.

As another example, in the case of WiFi Direct communication, the bi-directional authentication between apparatuses is completed by means of ProSe Discovery function, but subsequent establishment of the secure communication channel is based on the WiFi channel, therefore, the channel key is a WiFi key at this time. The so-called WiFi encryption refers to encryption technology used in international standard of 802.11, and mainly refers to Wired Equivalent Privacy (WEP) and WiFi Protected Access (WPA/WPA2). Particularly, the WEP and WPA use a RC4 encryption algorithm, while WPA2 uses an Advanced Encryption Standard (AES) encryption algorithm. The WiFi key herein refers to a key used for encrypting WiFi communication data with these algorithms.

In this case, the data security key generating unit 104 may be further configured to generate the data security key according to a Service Set Identifier (SSID) and the channel key, without relevant apparatus information.

The controlling unit 106 may be configured to control the service data protected using the data security key to be transmitted on the established secure communication channel.

Figure 2:
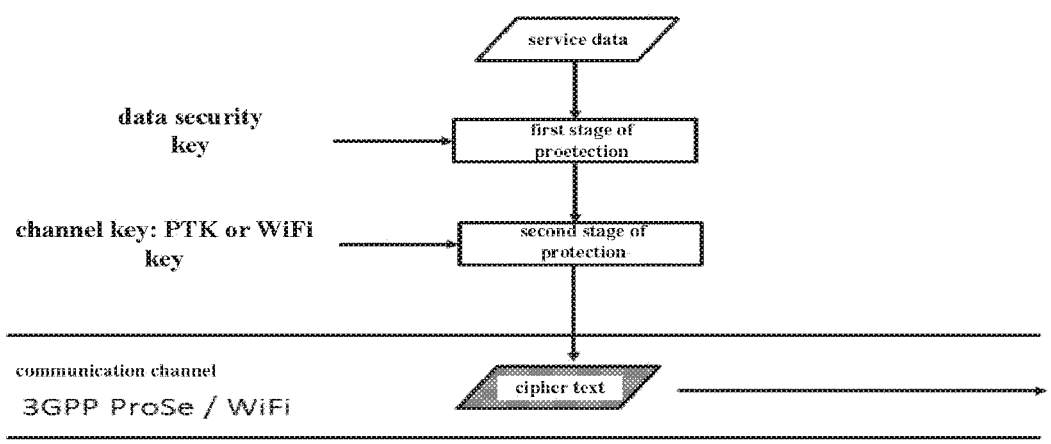
FIG. 2 is a schematic diagram illustrating an example of two-stage protection technology according to an embodiment of the disclosure.

As described above, in prior art, an additional third party secure channel is usually needed to protect the data, thereby increasing complexity of system applications. However, according to the technology of the disclosure, it is possible to transmit the protected service data on the secure communication channel established using the location-based service, thereby enabling bi-directional authentication of sending end and receiving end of the communication, protecting confidentiality and integrity of data transmission, protecting data transmission against attacks such as replay attack, listening, tampering or the like, which attacks may be generally implemented by attacks for the physical channel by the vicious third party. Specifically, in the technology of the disclosure, utilizing the data security key generated according to the channel key to protect the service data and transmitting the protected service data on the established secure communication channel are equivalent to implementing two-stage protection. The first stage of protection is to utilize the data security key to protect the service data, and the second stage of protection is to protect using the channel key (PTK or WiFi key) so as to transmit cipher text data on the established secure communication channel. Thus, even if the attacker implements the attack for the physical channel, for example, the channel key and the transmitted cipher text data have been acquired, the service data still can not be obtained since the original service data can be recovered only if the data security key is derived. In FIG. 2, a schematic diagram of an example of two-stage protection technology according to an embodiment of the disclosure is shown.

Figure 3:
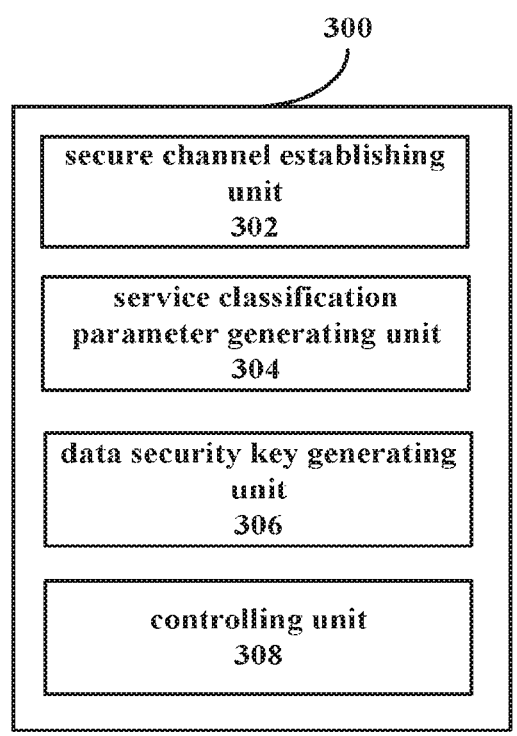
FIG. 3 is a block diagram illustrating another example of functional configuration of a device in a wireless communication system according to an embodiment of the disclosure.

Further, for the generation of the above data security key, it is also possible to utilize different algorithms according to the type of the service data so as to ensure strength of protection for corresponding service data. Next, another example of functional configuration of a device in a wireless communication system according to an embodiment of the disclosure will be described with reference to FIG. 3. FIG. 3 is a block diagram illustrating another example of functional configuration of a device in a wireless communication system according to an embodiment of the disclosure.

As shown in FIG. 3, a device 300 according to this embodiment may include a secure channel establishing unit 302, a service classification parameter generating unit 304, a data security key generating unit 306 and a controlling unit 308. Particularly, the examples of the functional configurations of the secure channel establishing unit 302 and the controlling unit 308 are substantially the same as those of the corresponding units described above with reference to FIG. 1, and no repeated description will be made herein. Next, only the examples of the functional configurations of the service classification parameter generating unit 304 and the data security key generating unit 306 will be described in detail below.

The service classification parameter generating unit 304 may be configured to generate a service classification parameter, which may include one or more of an algorithm for generating the data security key and a key length of the data security key, based on a type of the service data. Specifically, for example, if the transmitted service data has relatively high importance and needs relatively high security, a key generation algorithm having higher protection strength and/or a longer key length may be adopted. On the contrary, if the transmitted service data has low security requirements, a key generation algorithm having relatively low protection strength and/or a shorter key length may be adopted to reduce computation complexity. The type of the service data may be specified by application layer services, and may also be set by the user when installing and using the application layer services. For example, the service data may be classified according to information sensitivity or information privacy. As an example, the type of the service data may include payment data, and in this exemplary application, the first apparatus may be a mobile payment client, and the second apparatus may be a mobile payment server. However, it should understand that the service data may include any other data types that need to be transmitted safely, and the first and second apparatuses may also be any electronic apparatuses being capable of performing wireless communication and supporting the location-based service, without being limited to the above example.

Figure 4:
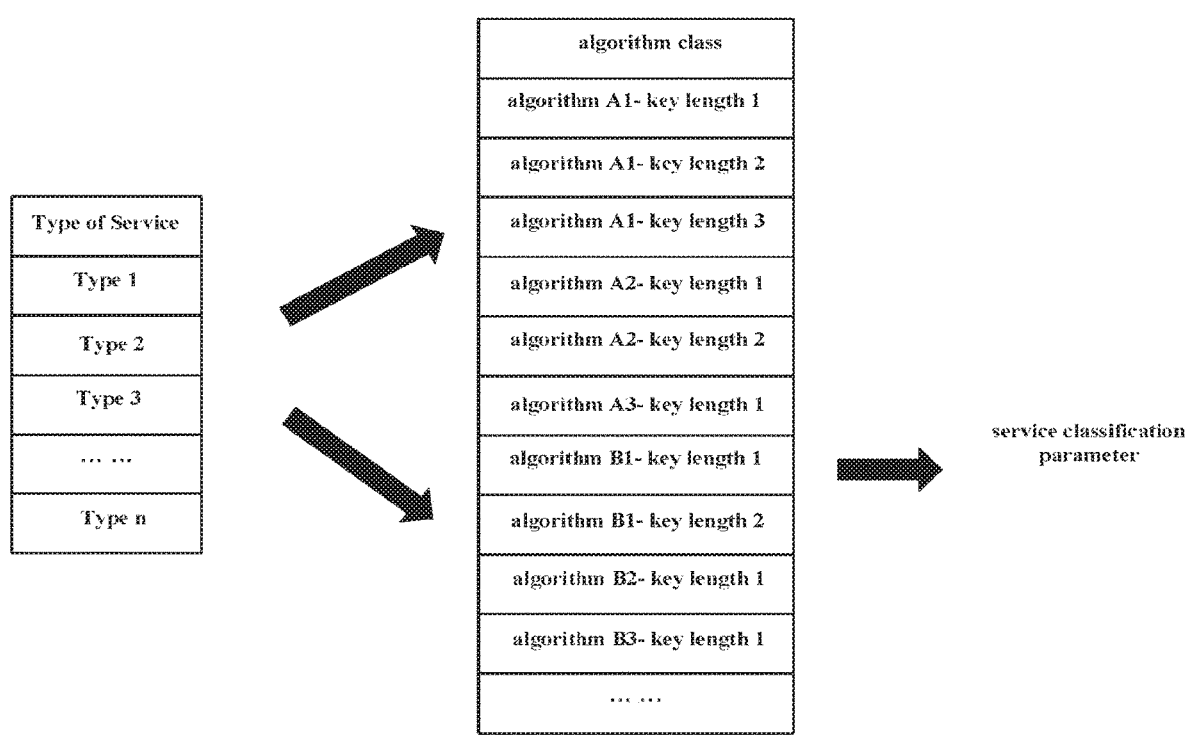
FIG. 4 is a schematic diagram illustrating an example of service classification parameter generation according to an embodiment of the disclosure.

FIG. 4 is a schematic diagram illustrating an example of service classification parameter generation according to an embodiment of the disclosure.

As shown in FIG. 4, for example, the service classification parameter generating unit 306 may determine, for example, according to the service type specified by the application layer service, the service classification parameter based on a pre-established mapping table, that is, completing mapping from service type to algorithm class, and further determine the key generation algorithm and the length of the data security key to be adopted in the specific algorithm class.

The data security key generating unit 306 may be further configured to generate the data security key based on the service classification parameter. In addition to the above channel key, the data security key generating unit 306 generates the data security key further based on the service classification parameter determined according to the service type, thereby enabling the data security key which is more suitable to the current service requirements to be generated.

Figure 5:
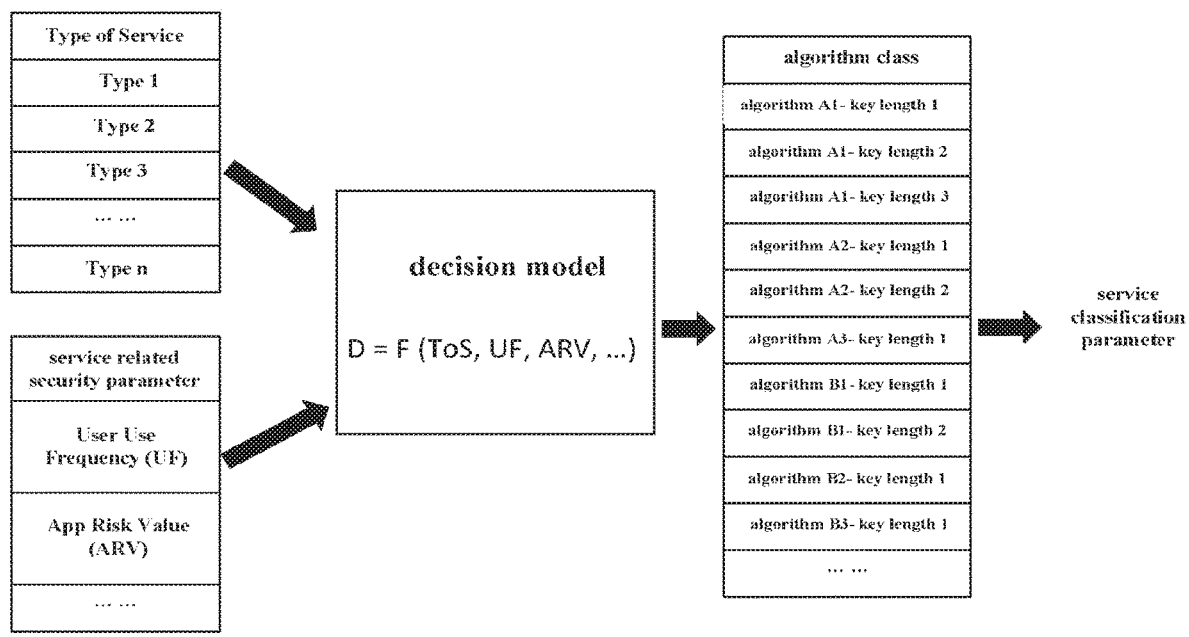
FIG. 5 is a schematic diagram illustrating another example of service classification parameter generation according to an embodiment of the disclosure.

FIG. 5 is a schematic diagram illustrating another example of service classification parameter generation according to an embodiment of the disclosure.

Preferably, the service classification parameter generating unit 304 may be further configured to generate the service classification parameter based on a security parameter related to the service data. The security parameter may be specified by the application layer service or the wireless communication system. Preferably, the security parameter may include at least one of a use frequency and a risk value. Specifically, the security parameter may be the use frequency of a user with respect to a certain application, or may also be the risk value of the application calculated statistically by the server of the application layer service.

As shown in FIG. 5, for example, the service classification parameter generating unit 304 may calculate, according to Type of Service (ToS) and Security Parameter (SP) specified by the application layer service, a decision value using a predetermined decision model. The decision value has correspondence to the algorithm class data (including the key generation algorithm and the key length and the like), and thus the final service classification parameter can be obtained according to the correspondence.

For example, the decision model may use the Type of Service (ToS, corresponding to service sensitivity), user use frequency (UF, corresponding to user habits, user dependence) and application service risk value (ARV, representing possibility that the application service is attacked viciously) as inputs to obtain the decision value D: D=F (ToS, UF, ARV), where F denotes a decision model function, and thus the service classification parameter generating unit 304 may determine the corresponding service classification parameter according to the decision value based on the correspondence. For the application service risk value ARV, for example, it may be determined whether the client application is in an abnormal use state or tends to be in the abnormal use state by statistically determining big data information such as amount of access for the client application, access source/destination or the like, whereby generating the application service risk value ARV for the client. Then, the application service risk value ARV is fed back to the application layer service client of the client apparatus and then introduced into the above decision model to obtain the decision value D, which corresponds to the protection strength (that is, including the key generation algorithm and the key length). Preferably, the decision model may dynamically adjust the strength of the algorithm according to the input service type and security parameter so as to provide the key generation algorithm and key length which are suitable to the current service requirements.

Figure 6:
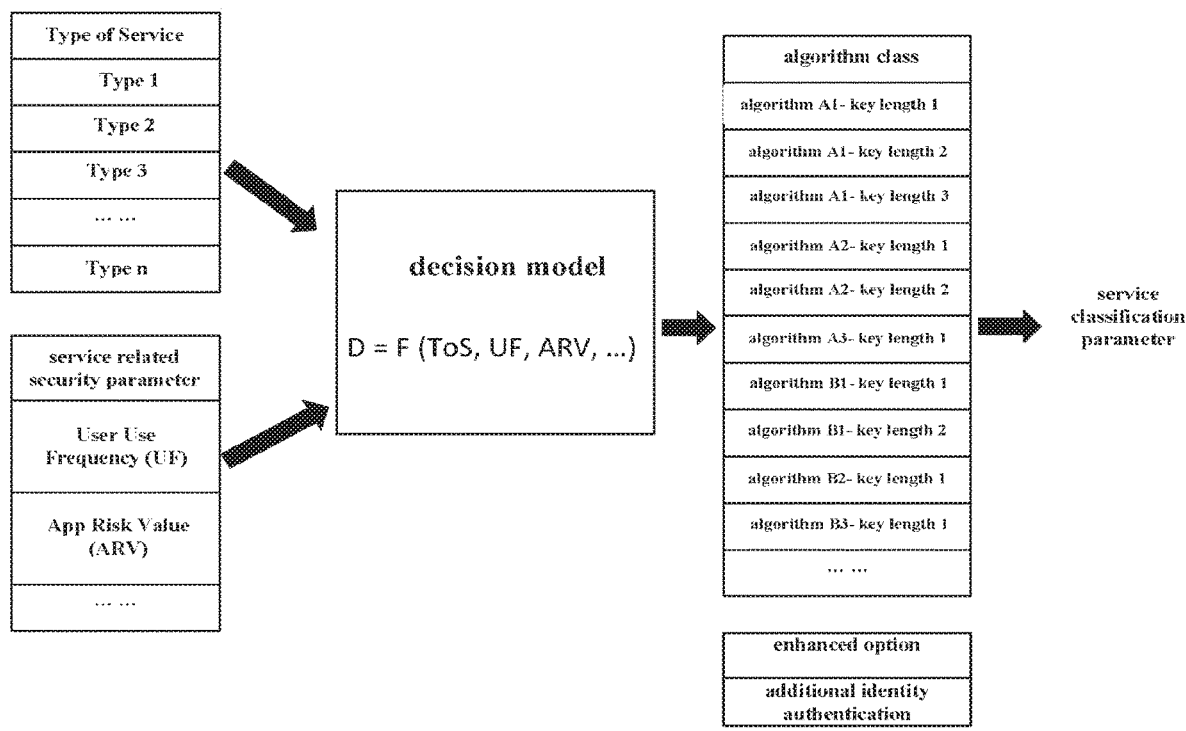
FIG. 6 is a schematic diagram illustrating yet another example of service classification parameter generation according to an embodiment of the disclosure.

FIG. 6 is a schematic diagram illustrating yet another example of service classification parameter generation according to an embodiment of the disclosure.

Further, preferably, the service classification parameter generating unit 304 may be further configured to generate the service classification parameter based on additional authentication. Specifically, as described above, the decision model may dynamically adjust the strength of the algorithm according to the input parameters (including the service type and the security parameter), and may further add additional authentication, for example, require the user to add one time of identity authentication on the basis of the operated client service or the like.

As shown in FIG. 6, in this example, the added identity authentication may be parallel with the algorithm class mapping table as an enhanced output option of the decision model, and thus the service classification parameter generating unit 304 may obtain the corresponding service classification parameter by further combining with the additional identity authentication, so as to enhance the protection strength.

It should understand that although examples of service classification parameter generation have been described above with reference to FIGS. 4-6, the disclosure is not limited thereto, and the service classification parameter may be generated by considering other input parameters so as to obtain the data security key which is more suitable to actual service requirements.

Figure 7:
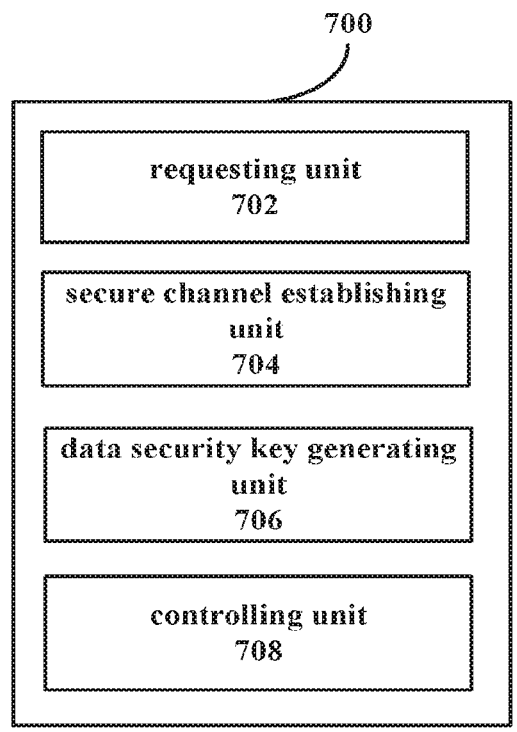
FIG. 7 is a block diagram illustrating yet another example of functional configuration of a device in a wireless communication system according to an embodiment of the disclosure.

FIG. 7 is a block diagram illustrating yet another example of a device in a wireless communication system according to an embodiment of the disclosure.

As shown in FIG. 7, a device 700 according to this embodiment may include a requesting unit 702, a secure channel establishing unit 704, a data security key generating unit 706 and a controlling unit 708. Particularly, examples of functional configurations of the secure channel establishing unit 704, the data security key generating unit 706 and the controlling unit 708 are substantially the same as those of the corresponding units described above with reference to FIG. 1, and thus no repeated description will be made herein. Only an example of functional configuration of the requesting unit 702 will be described in detail below.

The requesting unit 702 may be configured to send a connection request to a corresponding second apparatus among a plurality of second apparatuses based on location information. Assuming that there are a plurality of second apparatuses that may be connected to the first apparatus simultaneously, for example, in the application example of mobile secure payment, assuming that there are a plurality of payment servers capable of providing payment services at the same time, the first apparatus serving as the payment client may send the connection request to the corresponding payment server according to factors such as the location information and the like.

Then, in response to a response to the connection request returned by the second apparatus, the secure channel establishing unit 704 may establish corresponding secure communication channel. That is, for example, if the response returned by the payment server indicates allowance of connection with the payment client, the payment client may establish the secure communication channel with the payment server by the location-based service; in contrast, if the response indicates not allowance of connection of the payment client, the requesting unit 702 needs to send the connection request to other payment servers to establish the secure communication channel.

Preferably, the requesting unit 702 may be further configured to reselect, according to a predetermined trigger condition, the corresponding second apparatus from the plurality of second apparatuses based on the location information to send the connection request. Specifically, for example, if the currently connected second apparatus is disconnected due to device malfunction or the like, the requesting unit 702 may automatically send the connection request to other available second apparatuses (e.g., the payment server) nearby according to the location information to complete the current communication service. Thus, with the automatic reconnection function, it ensures the communication service is performed smoothly.

Further, preferably, the requesting unit 702 may be further configured to select, according to a preset forbiddance list, the corresponding second apparatus from the plurality of second apparatuses to send the connection request. Specifically, for example, according to indexes such as service performance or the like of the nearby plurality of second apparatuses (e.g. the payment server), the first apparatus (e.g. the payment client) may generate the corresponding forbiddance list (that is, the so-called "blacklist") and share the same with other payment clients, whereby the requesting unit 702 may select, according to the "blacklist" generated by this payment client or the "blacklist" shared by other payment clients, a payment server having better service performance from a plurality of payment servers to send the connection request, so as to ensure the subsequent communication service is performed smoothly.

Further, preferably, the requesting unit 702 may be further configured to select, according to a rewarding service set by the second apparatus in advance, the corresponding second apparatus from the plurality of second apparatuses to send the connection request. Specifically, for example, some second apparatuses (for example, the payment server) may provide for example "point accumulation" service or the like in order to improve amount of transaction, for example, each time the payment client is connected to the payment server and performs payment, the payment client may get points, and once the points are accumulated to a certain value, the points may counteract a certain payment amount or may be exchanged. Thus, such rewarding service may encourage more payment clients to connect to this payment server.

Figure 8:
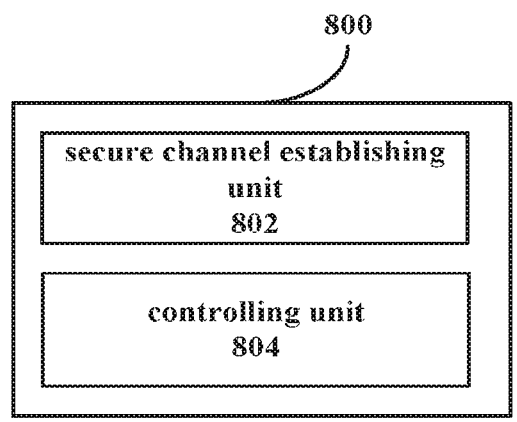
FIG. 8 is a block diagram illustrating an example of functional configuration of a device in a wireless communication system according to another embodiment of the disclosure.

Examples of functional configurations of the device on the first apparatus (for example, the payment client) side in the wireless communication system have been described above with reference to FIGS. 1-7, next, an example of functional configuration of a device on the second apparatus (for example, the payment server) side in a wireless communication system according to another embodiment of the disclosure will be described with reference to FIG. 8. FIG. 8 is a block diagram illustrating an example of functional configuration of a device in a wireless communication system according to another embodiment of the disclosure.

As shown in FIG. 8, a device 800 according to this embodiment may include a secure channel establishing unit 802 and a controlling unit 804. Next, examples of functional configurations of the respective units will be described in detail.

The secure channel establishing unit 802 may be configured to establish, in response to the connection request from the first apparatus, a secure communication channel between the first apparatus and the second apparatus using the location-based service. The specific procedure of establishing the secure communication channel between the first apparatus and the second apparatus using the location-based service may be referred to for example the communication channel establishing procedure in 3GPP ProSe, and no repeated description will be made herein. The first apparatus may be for example the mobile payment client, and the second apparatus may be for example the mobile payment server.

The controlling unit 804 may be configured to transmit the service data protected using the data security key on the established secure communication channel. The data security key is generated by the first apparatus according to at least the channel key extracted from the secure communication channel.

In the case that the location-based service is ProSe, the channel key may be PTK, and in the case that the location-based service is 3GPP core network assisted WLAN Direct communication, the channel key may be the WiFi key. The specific method for generating the data security key may be referred to the above description at corresponding positions, and no repeated description will be made herein.

As described above, in comparison to prior art, instead of initializing the transmission security parameters on the third party secure channel, in the embodiments of the disclosure, the protected service data is transmitted on the secure communication channel established between two parties of the communication, which enables to efficiently protect confidentiality and integrity of data transmission, protect the data transmission against attacks such as listening, tampering or the like, which attacks are generally implemented by attacks for the physical channel by the vicious third party.

Figure 9:
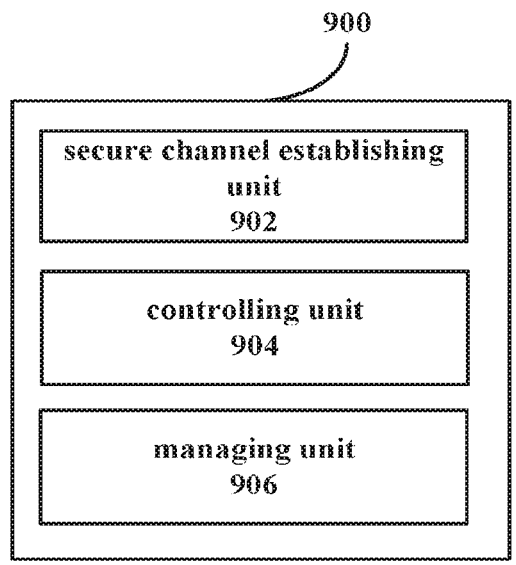
FIG. 9 is a block diagram illustrating an example of functional configuration of a device in a wireless communication system according to another embodiment of the disclosure.

FIG. 9 is a block diagram illustrating another example of functional configuration of a device in a wireless communication system according to another embodiment of the disclosure.

As shown in FIG. 9, a device 900 according to this embodiment may include a secure channel establishing unit 902, a controlling unit 904 and a managing unit 906. Particularly, examples of functional configurations of the secure channel establishing unit 902 and the controlling unit 904 are substantially the same as those of the corresponding units described above with reference to FIG. 8, and thus no repeated description will be made herein. Below, only an example of functional configuration of the managing unit 906 will be described in detail.

The managing unit 906 may be configured to reward the first apparatus according to the connection request of the first apparatus. Specifically, as described above, when there are multiple payment servers capable of payment around the first apparatus (for example, the payment client) at the same time, in order to encourage the payment client to connect to a particular payment server preferentially, this payment server may provide corresponding rewarding service (for example, point accumulation service) to reward the payment client connected thereto.

It should understand that the device on the second apparatus (for example, the payment server) side described above with reference to FIGS. 8 and 9 corresponds to the device on the first apparatus (for example, the payment client) side as described above, and thus the contents which are not described in detail herein may be referred to above description at corresponding positions, and no repeated description will be made herein.

It should understand that although the examples of the functional configurations of the devices in the wireless communication system have been described above with reference to the drawings, these are merely examples but not limitation, and those skilled in the art may modify the above examples of functional configurations according to the principle of the disclosure, for example, add, delete, alter, combine and sub-combine the above functional modules or the like, and all of these variations should naturally be considered as falling within the scope of the disclosure.

Figure 10:
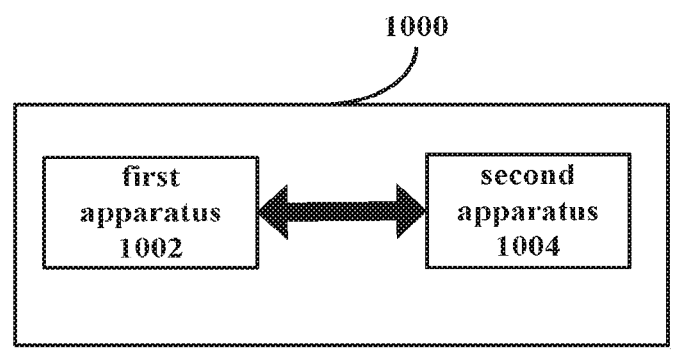
FIG. 10 is a block diagram illustrating an example of configuration of a wireless communication system according to an embodiment of the disclosure.

Next, an example of configuration of a wireless communication system according to an embodiment of the disclosure will be described with reference to FIG. 10. FIG. 10 is a block diagram illustrating an example of configuration of a wireless communication system according to an embodiment of the disclosure.

As shown in FIG. 10, a wireless communication system 1000 according to this embodiment may include a first apparatus 1002 and a second apparatus 1004.

The first apparatus 1002 may include one or more processors which may be configured to: establish a secure communication channel with the second apparatus 1004 using a location-based service, generate a data security key for protecting service data based on at least a channel key extracted from the secure communication channel, and control the service data protected using the data security key to be transmitted on the secure communication channel.

The second apparatus 1004 may include one or more processors which may be configured to: establish, in response to a connection request from the first apparatus 1002, the secure communication channel with the first apparatus 1002 using the location-based service, and control the service data protected using the data security key to be transmitted on the secure communication channel.

Figure 11:
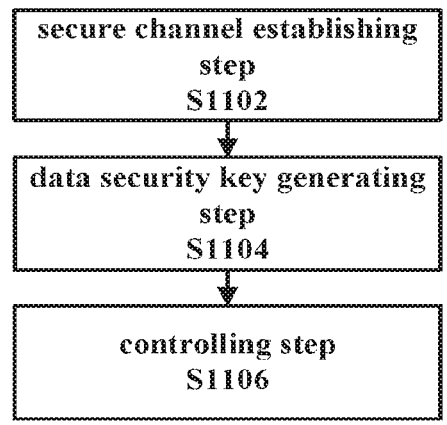
FIG. 11 is a flow chart illustrating an example of a procedure of a method in a wireless communication system according to an embodiment of the disclosure.

FIG. 11 is a flow chart illustrating an example of a procedure of a method in a wireless communication system according to an embodiment of the disclosure.

As shown in FIG. 11, the method according to this embodiment may include a secure channel establishing step S1102, a data security key generating step S1104 and a controlling step S1106. Processing in each of the steps will be described specifically below.

In the secure channel establishing step S1102, a secure communication channel between a first apparatus and a second apparatus is established using a location-based service. The location-based service may be for example ProSe, and the establishing of the secure communication channel may be referred to corresponding descriptions in the 3GPP ProSe, and no repeated description will be made herein.

Next, in the data security key generating step S1104, a data security key for protecting service data is generated based on at least a channel key extracted from the secure communication channel. The channel key may be for example the PTK or WiFi key. The specific key generation method may be referred to the above description at corresponding positions in the embodiments of the corresponding device, and no repeated description will be made herein.

Then, in the controlling step S1106, the service data protected using the data security key is transmitted on the secure communication channel.

Figure 12:
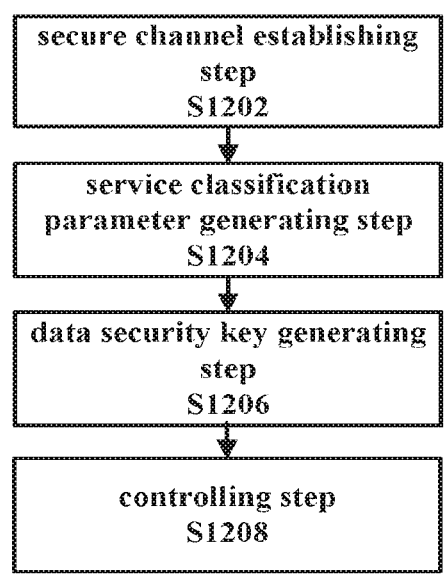
FIG. 12 is a flow chart illustrating another example of a procedure of a method in a wireless communication system according to an embodiment of the disclosure.

FIG. 12 is a flow chart illustrating another example of a procedure of a method in a wireless communication system according to an embodiment of the disclosure.

As shown in FIG. 12, the method according to this embodiment may include a secure channel establishing step S1202, a service classification parameter generating step S1204, a data security key generating step S1206 and a controlling step S1208. Particularly, the processing in the secure channel establishing step S1202 and the controlling step S1208 is substantially the same as that in the corresponding steps described above with reference to FIG. 11, and thus no repeated description will be made herein. Only processing in the service classification parameter generating step S1204 and the data security key generating step S1206 will be described in detail below.

In the service classification parameter generating step S1204, a service classification parameter is generated based on a type of the service data, in which the service classification parameter may include at least one of an algorithm for generating the data security key and a key length of the data security key. Preferably, the type of the service data may be classified according to information sensitivity or information privacy.

Further, in the service classification parameter generating step S1204, the service classification parameter may be generated further based on a security parameter related to the service data and/or additional identity authentication, in which the security parameter may include at least one of a use frequency and a risk value.

Then, in the data security key generating step S1206, in addition to the channel key extracted from the secure channel described above, the data security key is generated further based on the generated service classification parameter.

Figure 13:
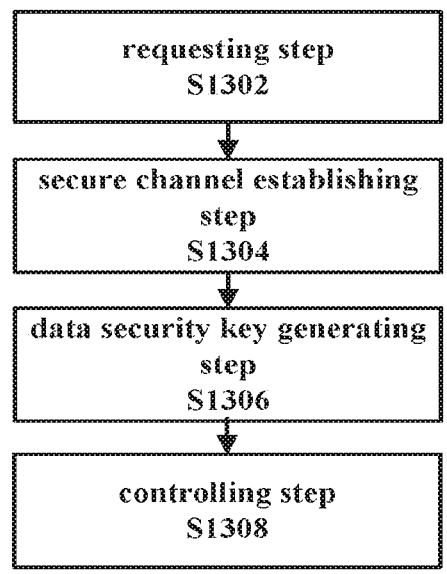
FIG. 13 is a flow chart illustrating yet another example of a procedure of a method in a wireless communication system according to an embodiment of the disclosure.

FIG. 13 is a flow chart illustrating yet another example of a procedure of a method in a wireless communication system according to an embodiment of the disclosure.

As shown in FIG. 13, the method according to this embodiment may include a requesting step S1302, a secure channel establishing step S1304, a data security key generating step S1306 and a controlling step S1308. Particularly, the processing in the secure channel establishing step S1304, the data security key generating step S1306 and the controlling step S1308 is substantially the same as that in the corresponding steps described above with reference to FIG. 11, and thus no repeated description will be made herein. Only processing in the requesting step S1302 will be described in detail below.

In the requesting step S1302, a connection request is sent to a corresponding second apparatus among a plurality of second apparatuses based on location information. Specifically, according to specific service requirements, the connection request may be sent to the corresponding second apparatus among the plurality of second apparatuses nearby based on the location information so as to establish the secure communication channel.

Preferably, in the requesting step S1302, according to a predetermined triggering condition (for example, the connection is disconnected due to malfunction of the second apparatus or the like), the corresponding second apparatus may be reselected from the plurality of second apparatuses based on the location information to send the connection request. This provides for example automatic reconnection function to ensure the communication service is performed smoothly. Further, preferably, in the requesting step S1302, the corresponding second apparatus may be further selected from the plurality of second apparatuses according to a preset forbiddance list (for example, a "blacklist" set according to service performance, and this list can be shared among a plurality of apparatuses) to send the connection request thereto, so as to ensure the server apparatus with better service performance can be connected preferentially. Further, preferably, in the requesting step S1302, the corresponding second apparatus may be selected from the plurality of second apparatuses according to a rewarding service set by the second apparatus in advance to send the connection request thereto, thus, the first apparatus which is connected to a certain second apparatus many times may correspondingly obtain the rewarding service.

Next, in the secure communication channel establishing step S1304, the secure communication channel between the first apparatus and the second apparatus may be established according to the response to the connection request of the corresponding second apparatus (that is, whether the connection is permitted).

The method described with reference to FIGS. 11-13 herein corresponds to the embodiments of the device on the first apparatus side described above with reference to FIGS. 1-7, and thus the contents which are not described in detail herein may be referred to descriptions at corresponding positions in the device embodiments, and no repeated description will be made herein.

Figure 14:
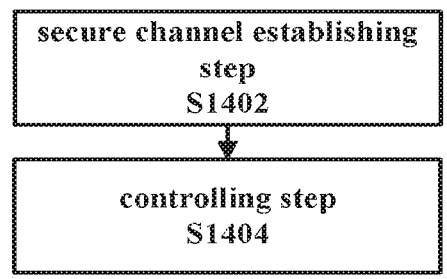
FIG. 14 is a flow chart illustrating an example of a procedure of a method in a wireless communication system according to another embodiment of the disclosure.

FIG. 14 is a flow chart illustrating an example of a procedure of a method in a wireless communication system according to another embodiment of the disclosure.

As shown in FIG. 14, the method according to this embodiment may include a secure channel establishing step S1402 and a controlling step S1404.

First, in the secure channel establishing step S1402, in response to a communication request from a first apparatus, a secure communication channel between the first apparatus and a second apparatus is established using a location-based service.

Next, in the controlling step S1404, the service data protected using a data security key may be controlled to be transmitted on the established secure communication channel. The data security key is generated by the first apparatus according to at least the channel key extracted from the secure communication channel.

Figure 15:
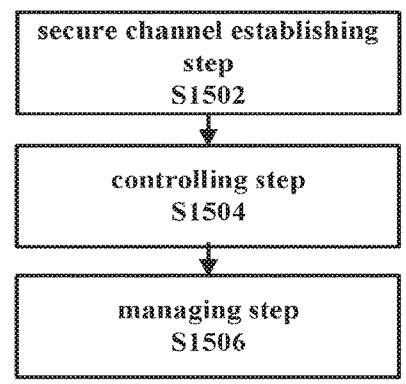
FIG. 15 is a flow chart illustrating another example of a procedure of a method in a wireless communication system according to another embodiment of the disclosure.

FIG. 15 is a flow chart illustrating another example of a procedure of a method in a wireless communication system according to another embodiment of the disclosure.

As shown in FIG. 15, the method according to this embodiment may include a secure channel establishing step S1502, a controlling step S1504 and a managing step S1506. Particularly, the processing in the secure channel establishing step S1502 and the controlling step S1504 is substantially the same as that in the corresponding steps described above with reference to FIG. 14, and thus no repeated description will be made herein. Only processing in the managing step S1506 will be described in detail below.

In the managing step S1506, the first apparatus may be rewarded according to the connection request of the first apparatus. For example, each time the first apparatus is connected to a particular second apparatus, the second apparatus will provide "point accumulation" service for the first apparatus to encourage the first apparatus to connect to the second apparatus.

The method described with reference to FIGS. 14 and 15 herein corresponds to the embodiments of the device on the second apparatus side described above with reference to FIGS. 8 and 9, and thus the contents which are not described in detail herein may be referred to the above descriptions at corresponding positions in the device embodiments, and no repeated description will be made herein.

It should note that although examples of procedures of the methods in the wireless communication system according to the embodiments of the disclosure have been described above, these are merely examples but not limitation, and those skilled in the art may modify the above embodiments according to the principle of the disclosure, for example, add, delete or combine steps in each of the embodiments or the like, and all of these modifications should fall within the scope of the disclosure.

According to the embodiments of the disclosure, by transmitting on the protected secure physical channel the upper layer service data protected using the data security key, which is generated according to the channel key extracted from the secure physical channel, without depending on the third party secure channel, the security of data transmission is improved.

Further, according to an embodiment of the disclosure, there is also provided an electronic apparatus which may include one or more processors, in which the one or more processors may be configured to perform the method or functions of corresponding units in the wireless communication system according to the embodiments of the disclosure as described above.

It should understand that the machine executable instructions in the storage medium and the program product according to the embodiments of the disclosure may also be configured to perform the methods corresponding to the above device embodiments, and thus the contents which are not described in detail herein may be referred to the foregoing descriptions at corresponding positions, and no repeated description will be made herein.

Accordingly, a storage medium on which the above program product storing machine executable instructions is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1600 illustrated in FIG. 16, which can perform various functions when various programs are installed thereon.

Figure 16:
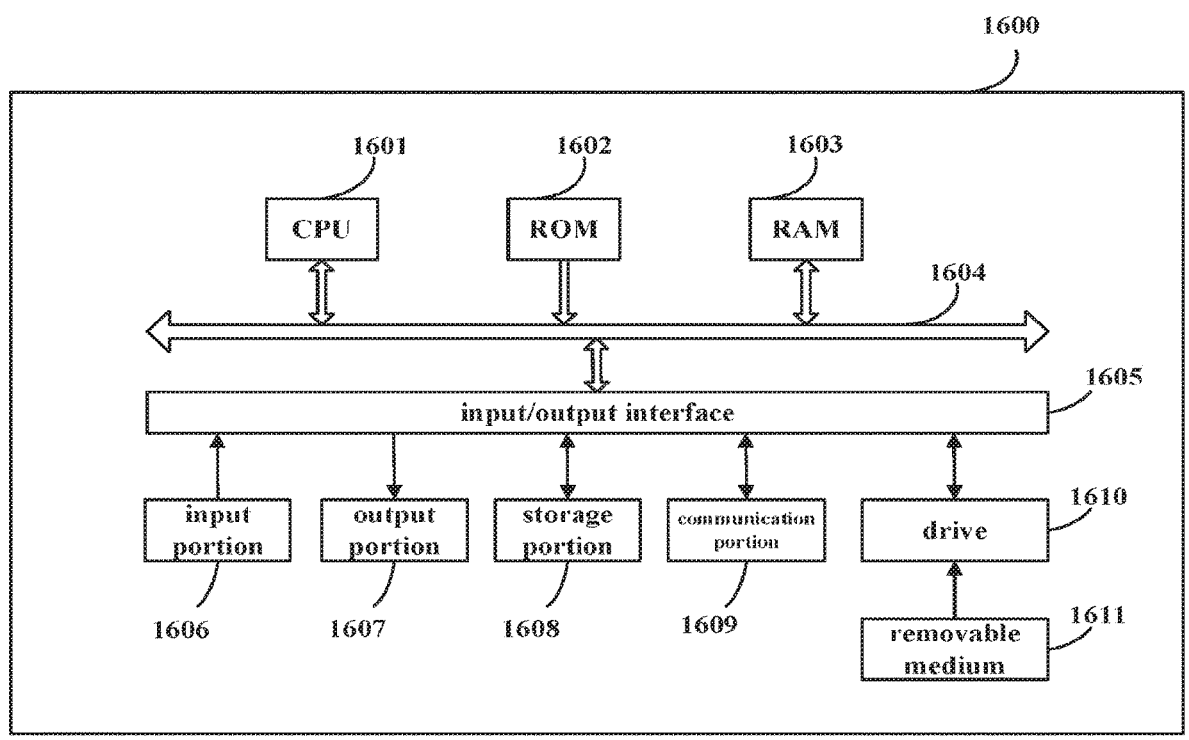
FIG. 16 is a block diagram illustrating an exemplary structure of a personal computer which is an information processing apparatus that may be adopted in an embodiment of the disclosure.

In FIG. 16, a Central Processing Unit (CPU) 1601 performs various processes according to a program stored in a Read Only Memory (ROM) 1602 or loaded from a storage portion 1608 into a Random Access Memory (RAM) 1603 in which data required when the CPU 1601 performs the various processes is also stored as needed.

The CPU 1601, the ROM 1602 and the RAM 1603 are connected to each other via a bus 1604 to which an input/output interface 1605 is also connected.

The following components are connected to the input/output interface 1605: an input portion 1606 including a keyboard, a mouse, etc.; an output portion 1607 including a display, e.g., a Cathode Ray Tube (CRT), a Liquid Crystal Display (LCD), etc., a speaker, etc.; a storage portion 1608 including a hard disk, etc.; and a communication portion 1609 including a network interface card, e.g., an LAN card, a modem, etc. The communication portion 1609 performs a communication process over a network, e.g., the Internet.

A drive 1610 is also connected to the input/output interface 1605 as needed. A removable medium 1611, e.g., a magnetic disk, an optical disk, an magneto optical disk, a semiconductor memory, etc., can be installed on the drive 1610 as needed so that a computer program fetched therefrom can be installed into the storage portion 1608 as needed.

In the case that the foregoing series of processes are performed in software, a program constituting the software is installed from a network, e.g., the Internet, etc., or a storage medium, e.g., the removable medium 1611, etc.

Those skilled in the art shall appreciate that such a storage medium will not be limited to the removable medium 1611 illustrated in FIG. 16 in which the program is stored and which is distributed separately from the apparatus to provide a user with the program. Examples of the removable medium 1611 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1602, a hard disk included in the storage portion 1608, etc., in which the program is stored and which is distributed together with the apparatus including the same to the user.

Hereinafter, specific application examples to which the technology of the disclosure is applied will be described by taking the mobile secure payment as a specific application scene example. However, it should understand that the applications of the disclosure are not limited to the mobile secure payment, and can be applied to any fields requiring secure data transmission.

Figure 17:
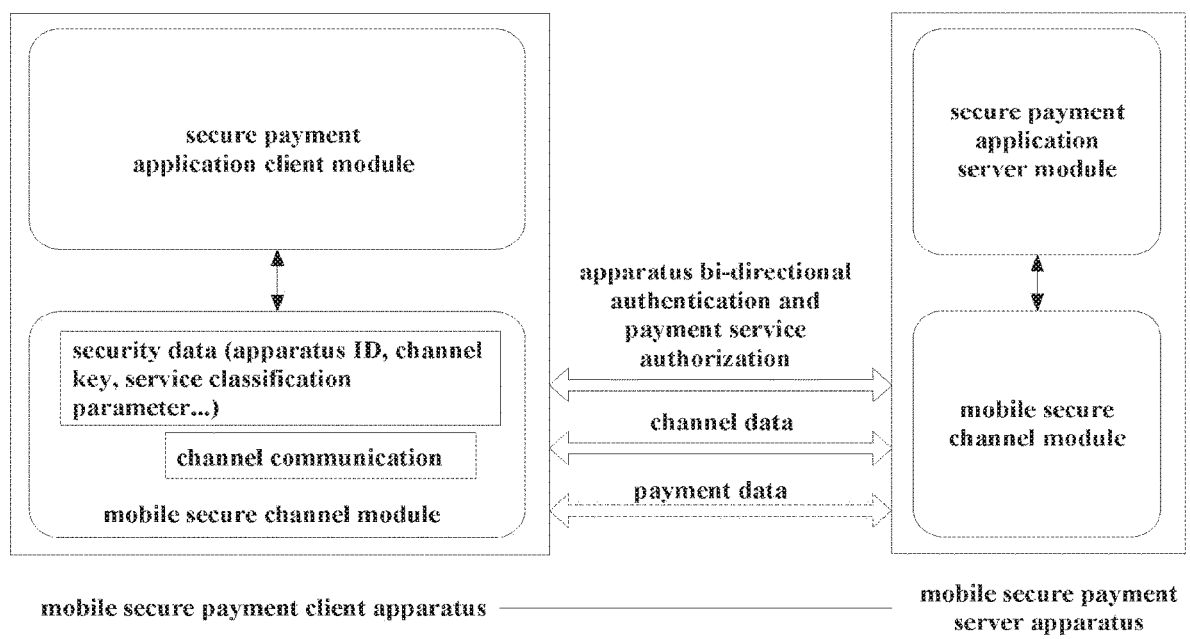
FIG. 17 is a block diagram illustrating an example of configuration of a mobile secure payment system to which the technology of the disclosure is applied.

FIG. 17 is a block diagram illustrating an example of configuration of a mobile secure payment system to which the technology of the disclosure is applied.

As shown in FIG. 17, in a mobile secure payment client apparatus as an example of the first apparatus and a mobile secure payment server apparatus as an example of the second apparatus, a mobile secure channel module implements location-based bi-directional authentication and service authorization between the mobile secure payment client apparatus and the mobile secure payment server apparatus, then generates a payment transaction security parameter (that is, the data security key) for protecting the secure payment application communication on the upper layer. Then, the authenticated mobile secure payment client apparatus and mobile secure payment server apparatus transmit the protected upper layer communication data over the established mobile secure channel, and a secure payment application client module and a secure payment application server module transmit payment data on the protected secure channel. Hereinafter, specific operations performed by the mobile secure channel module, the secure payment application client module and the secure payment application server module will be described in detail respectively.

Specifically, implementing the location-based bi-directional authentication and service authorization between the mobile secure payment client apparatus and the mobile secure payment server apparatus by the mobile secure channel module may include the following procedure.

First, the payment client apparatus searches for available payment server apparatuses according to the location information and sends the connection request. The user of the payment client apparatus may define a specific range of the location information. For example, it may be defined as the payment server apparatuses within a certain physical distance to realize short-distance payment; it may be also defined as the payment server apparatuses within a specified serving range under the same location information service provider to realize slightly long-distance payment; and it is also possible that the location information service provider serves as a relay to realize long-distance payment.

Second, the payment server apparatus responds to the connection request and exchanges apparatus authentication information with the payment client apparatus to complete the bi-directional authentication. The bi-directional authentication between the apparatuses may be performed directly by the payment client apparatus and the payment server apparatus, and may be also performed through assistance of the service provider proving the location information as the third party. The service provider providing the location information provides identification information to the payment client apparatus and the payment server apparatus and pre-allocates required security verification data information so as to ensure channel communication security. The mobile secure channel module realizes the following security function: enabling bi-directional authentication between the sending end and the receiving end of the communication and protecting confidentiality and integrity of data transmission; protecting the data transmission against replay attack, listening and tampering; and enabling resistance for attack of identity blab for apparatuses and transaction. The security verification data information of the mobile secure channel module may include for example payment client apparatus identification information ID, payment server apparatus identification information ID, the channel communication key and the like.

Finally, the mobile secure payment client apparatus performs payment service authorization for the authenticated mobile secure payment server apparatus.

Generating the payment transaction security parameter for protecting the secure payment application communication on the upper layer by the mobile secure channel module may specifically include the following procedure for example.

Corresponding identification information ID is extracted for the mobile secure payment client apparatus and the mobile secure payment server apparatus. The ID contains a unique identifier allocated by the service provider providing the location information to be used for performing secure communication by the mobile secure payment client apparatus and the mobile secure payment server apparatus, which is used to uniquely identify the secure communication between the payment client apparatus and the payment server apparatus.

The channel key is extracted from the secure mobile channel to generate the payment transaction security parameter required for the transaction session, including a verification key AK protecting verifiability, an encryption and decryption key CK protecting data confidentiality and an integrity key IK protecting data integrity. For example, the following generation manner may be adopted:

(AK, CK, IK)=KDF(ID, Channel key, Timestamp, RAND, Counter)

Where the Timestamp indicates a timestamp, RAND indicates a random number and Counter indicates a counter value.

The Key Derivation Function (KDF) may adopt RFC5869HMAC-based Extract-and-Expand Key Derivation Function (HKDF), and may also adopt Password-Based Key Derivation Function, such as RFC2898 Password-Based Key Derivation Function 2 (PBKDF2), or PKDF recommended by NIST(NIST Special Publication 800-132), and the disclosure makes no limitation on this.

It should understand that the manner of generating the data security key given above is only an example but not limitation, and the data security key may also be generated according to the service type, the security parameter or the like, as described above.

Transmitting the payment data on the protected secure channel and completing the payment transaction by the secure payment application client module and the secure payment application server module may specifically include the following procedure.

First, under the protection of the payment transaction security parameter required for the transaction session, security information required for the transaction is initialized according to specific payment manners and scenes. The specific payment manner may be payment using telephone charge of an operator by the mobile apparatus, or credit card payment by the mobile apparatus binding an entity card (for example, a bank card, a credit card, a transportation card or the like), or payment using payment account by the mobile apparatus binding a remote ID (for example, WeChat payment, Alipay wallet, Baidu wallet or the like).

Then, under the protection of the security information, the payment transaction data is transmitted, including transaction request data, payment account information, payment verification information or the like.

Finally, the transaction is finished after the user confirms the transaction data. As above, transaction confirmation information is also transmitted under the protection of the security information.

Next, specific application examples of the technology of the disclosure will be described in combination with the mobile secure payment system described with reference to FIG. 17.

Figure 18:
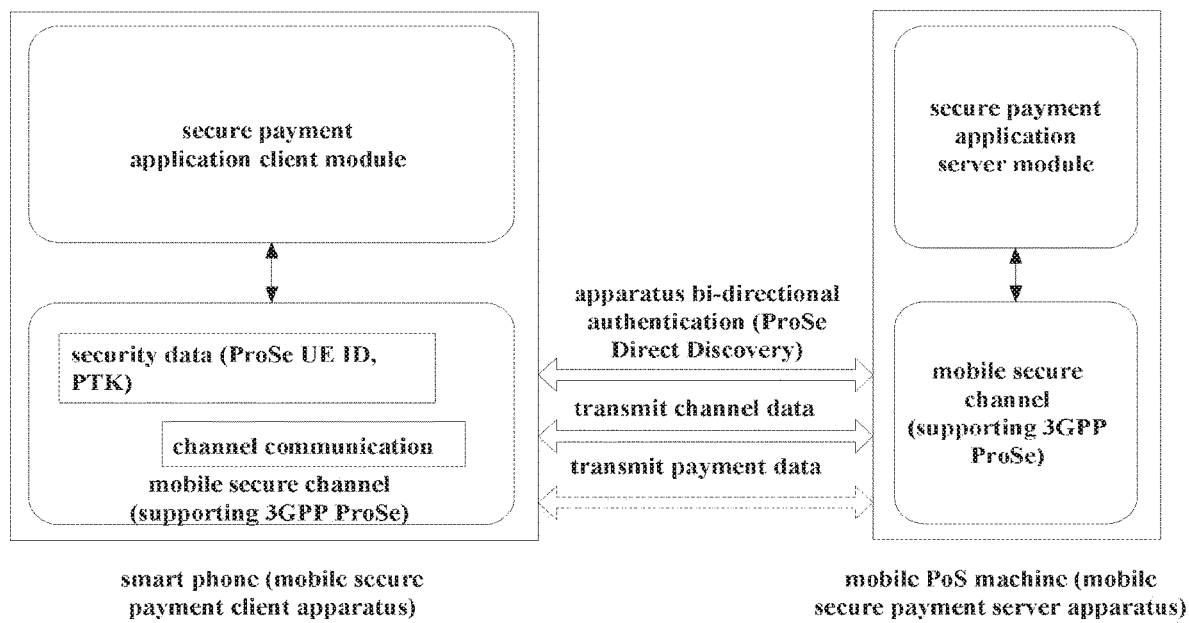
FIG. 18 is a schematic diagram illustrating an application example of a secure payment transaction based on 3GPP ProSe communication channel to which the technology of the disclosure is applied.

FIG. 18 is a schematic diagram illustrating an application example of a secure payment transaction based on 3GPP ProSe communication channel to which the technology of the disclosure is applied.

In the example as shown in FIG. 18, the secure payment transaction is completed by implementing the following steps by a smart phone and a mobile POS machine supporting 3GPP ProSe as the examples of the mobile payment client and the mobile payment server.

(1) apparatus discovery and authentication: the mobile payment client and the mobile payment server discover counterpart apparatus through 3GPP ProSe Direct Discovery procedure and complete apparatus authentication. The ProSe Direct Discovery procedure generally includes the following steps:

ProSe service authorization: a ProSe module requests the core network for ProSe service authorization;

Discovery requesting: the mobile payment client obtaining the ProSe service authorization sends a discovery request and corresponding service configuration information to surroundings;

Discovery responding: the surrounding mobile payment server in listening receives the discovery request;

Matching reporting: the core network confirms the received discovery request and the identity of the requester.

Here, identity recognizing of the mobile payment client and the mobile payment server is completed by the mobile core network providing the location service.

(2) payment service authorization: the payment client performs payment service authorization for the verified payment server.

(3) establishing of secure communication channel: the mobile payment client and the mobile payment server establish secure communication through 3GPP ProSe Direct communication. ProSe UE ID is used to uniquely identify the ProSe client. The communication between the mobile payment client and the mobile payment server is protected using the security information generated from the PTK.

(4) initialization of payment transaction security parameter: a set of keys required for protecting the secure payment transaction are generated from the security data (ProSe UE ID, PTK) in the secure communication channel.

It should note that the above steps can be completed by the mobile payment client in real time with the assistance of the mobile core network providing the location service, and can also be requested in advance in a case that the location does not change or the movement of the location does not go beyond the range of the same serving cell.

(5) completing the protected secure transaction: the secure transaction data is transmitted under the protection of the set of keys generated in the foregoing step.

(6) finally, the transaction is completed after the user confirms the transaction data. As above, the transaction confirmation information is also transmitted under the protection of the security information.

Figure 19:
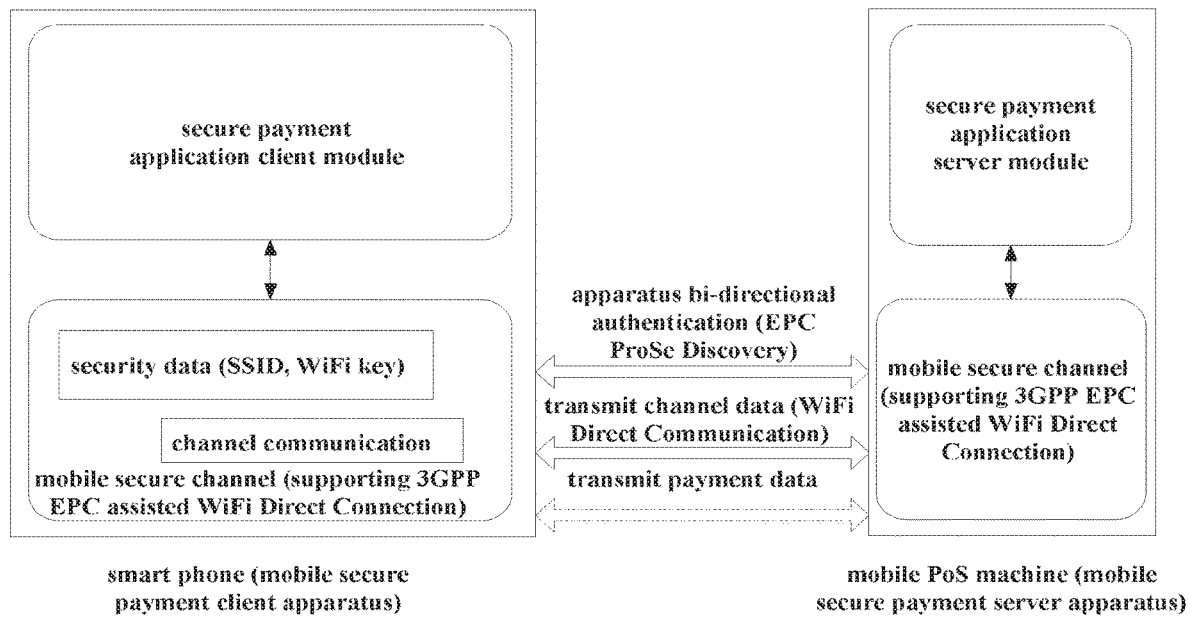
FIG. 19 is a schematic diagram illustrating an application example of a secure payment transaction based on 3GPP core network assisted WLAN direct communication channel to which the technology of the disclosure is applied.

FIG. 19 is a schematic diagram illustrating an application example of a secure payment transaction based on 3GPP core network assisted WLAN direct communication channel to which the technology of the disclosure is applied.

In the application example as shown in FIG. 19, the secure payment transaction is completed by performing the following steps by the smart phone and POS machine supporting 3GPP EPC-assisted WiFi direct as examples of the mobile payment client and the mobile payment server.

(1) apparatus discovery and authentication: the mobile payment client and the mobile payment server discover counterpart apparatus through 3GPP EPC-level ProSe Discovery and complete apparatus verification.

(2) payment service authorization: the mobile payment client performs payment service authorization for the verified mobile payment server.

(3) establishing of secure communication channel: if the 3GPP EPC judges the mobile payment client and the mobile payment server are at near field positions, the 3GPP EPC takes charge of exchanging WLAN configuration information and assisting establishment of WLAN direct connection.

(4) initialization of payment transaction security parameter: a set of keys required for protecting the secure payment transaction are generated from the security data (SSID, WLAN key) in the secure communication channel in the forgoing step.

It should note that the above steps can be completed by the mobile payment client in real time with the support of the mobile core network providing the location service, and can also be requested in advance in a case that the location does not change or the movement of the location does not go beyond the range of the same serving cell.

(5) completing the protected secure transaction: the secure transaction data is transmitted under the protection of the set of keys generated in the foregoing step.

(6) finally, the transaction is completed after the user confirms the transaction data. As above, the transaction confirmation information is also transmitted under the protection of the security information.

Next, specific embodiments of the disclosure will be explained with payment application instances in different payment manners as an example with reference to FIGS. 20-22.

Figure 20:
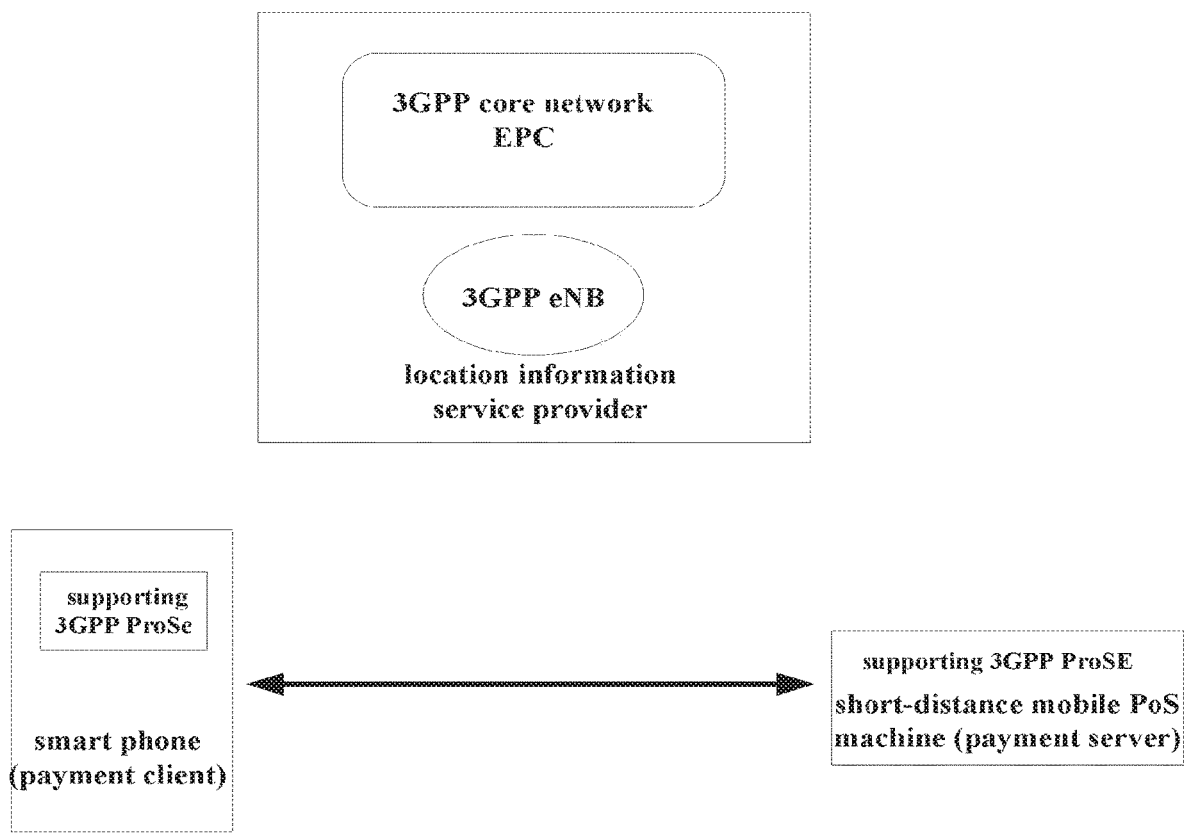
FIG. 20 is a schematic diagram illustrating an application example of a short-distance secure payment transaction of a Point-of-Sales (PoS) to which the technology of the disclosure is applied.

FIG. 20 is a schematic diagram illustrating an application example of a short-distance secure payment transaction of a POS machine to which the technology of the disclosure is applied.

The example as shown in FIG. 20 is generally applied to payment after arrival of goods in network shopping, smart bus or the like. In this embodiment, the smart phone serves as the payment client, and the mobile PoS machine or other payment application card reader serves as the payment server. In this embodiment, explanation is made with the payment manner of the credit card payment by the mobile apparatus binding the entity card (for example, the bank card, the credit card, the transportation card or the like) as an example, but it should understand that the technology to which the disclosure relates can also be applied to other payment manners.

First, the payment client and the payment server complete apparatus discovery, authentication, payment service authorization, establishing of secure communication channel and initialization of payment transaction security parameter by steps (1)-(4) in the secure payment transaction application based on 3GPP ProSe communication channel or the transaction based on 3GPP core network assisted WLAN direct connection communication channel as described above. Then, the data transmission between the payment client and the payment server is performed on the established secure channel. In this application scene, these steps should be completed in real time.

Then, the payment server transmits the transaction data, including transaction ID, transaction amount, transaction description or the like.

Finally, the payment client submits account information and other information required for payment.

An application example of an in-store slightly long-distance secure payment transaction will be described with reference to FIG. 21 below. FIG. 21 is a schematic diagram illustrating an application example of a slightly long-distance secure payment transaction of in-store shopping to which the technology of the disclosure is applied.

Figure 21:
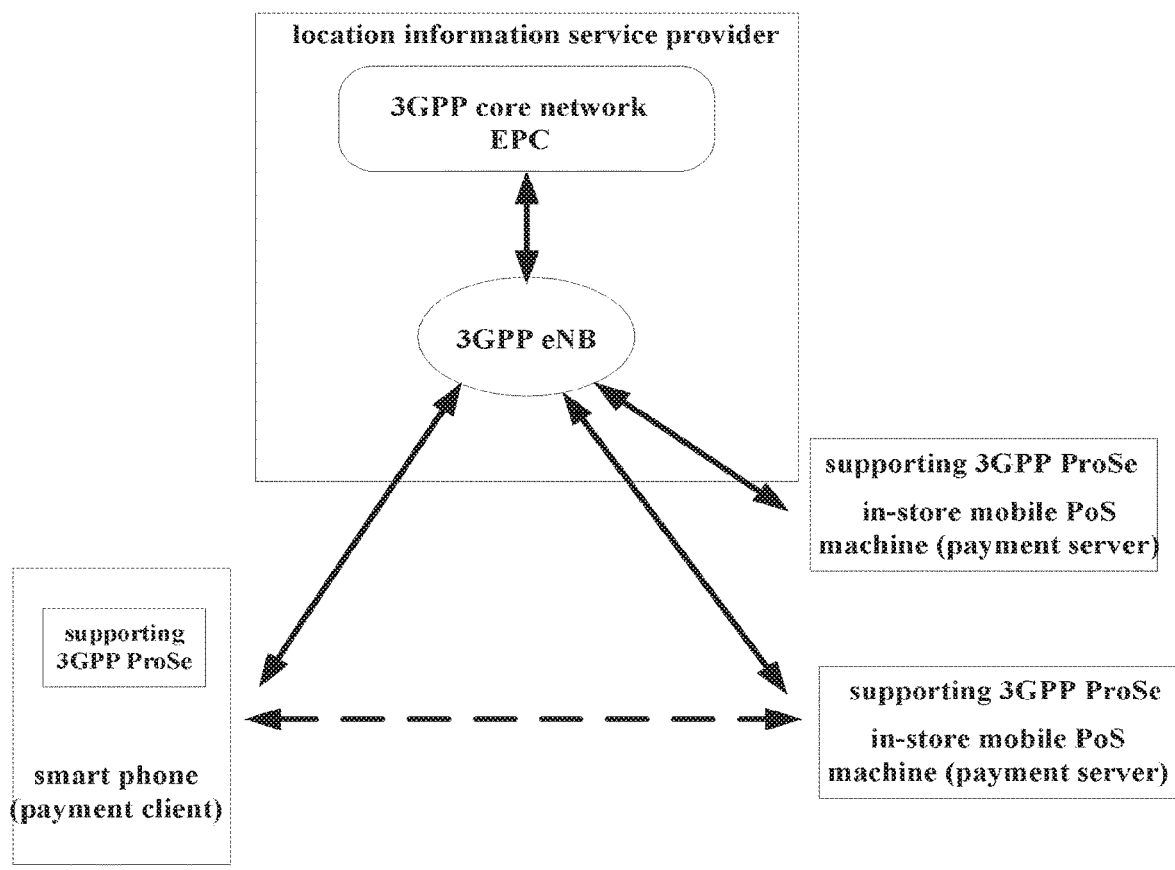
FIG. 21 is a schematic diagram illustrating an application example of a slightly long-distance secure payment transaction of in-store shopping to which the technology of the disclosure is applied.

In the application example as shown in FIG. 21, the smart phone serves as the payment client, and the in-store POS machine serves as the payment server. Explanation is made with the payment using payment account by the mobile apparatus binding a remote ID (for example, WeChat payment, Alipay wallet, Baidu wallet or the like) as an example in this embodiment, but the technology to which the disclosure relates is also correspondingly applied to other payment manners. When shopping in a real store, a purchaser usually pays at a shopping counter after selecting the goods, however, according to the mobile secure payment to which the disclosure relates, the purchaser may directly pay on the spot immediately after selecting the goods. The merchant may dispose multiple payment servers in the store, and the purchaser may select an idle payment server to connect.

First, as in the above application instance, the payment client and the payment server complete apparatus discovery, authentication, payment service authorization, establishing of secure communication channel and initialization of payment transaction security parameter by steps (1)-(4) in the secure payment transaction application based on 3GPP ProSe communication channel or the transaction based on 3GPP core network assisted WLAN direct connection communication channel as described above. Then, the data transmission between the payment client and the payment server is performed on the established secure channel. In this application scene, these steps may be performed when the purchaser enters the store, or may be completed in real time when the purchaser needs to pay.

Then, a seller generates a transaction ID, alternatively, the transaction ID may be generated by scanning a barcode on the goods by the purchaser autonomously and is sent to the payment server of the merchant.

Next, the payment server confirms the transaction ID and the transaction amount, and returns transaction confirmation information to the payment client.

Finally, the payment client submits account information and other information related to payment.

Next, an application example of a long-distance secure payment transaction will be described with reference to FIG. 22. FIG. 22 is a schematic diagram illustrating an application example of a long-distance secure payment transaction of TV shopping to which the technology of the disclosure is applied.

Figure 22:
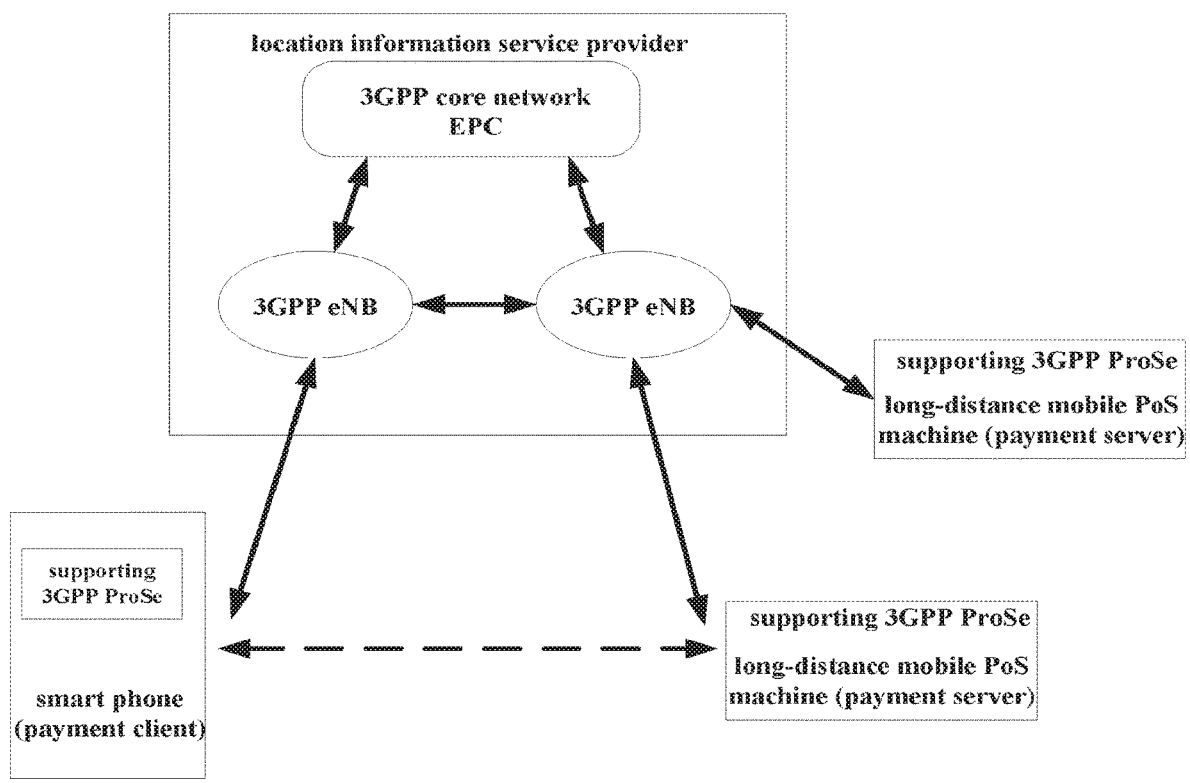
FIG. 22 is a schematic diagram illustrating an application example of a long-distance secure payment transaction of TV shopping to which the technology of the disclosure is applied.

In the application example as shown in FIG. 22, the smart phone serves as the payment client, and a distant POS machine serves as the payment server. Explanation is made with payment by the mobile apparatus using telephone charge of an operator as an example in this embodiment, but the technology to which the disclosure relates is also correspondingly applied to other payment manners.

First, as in the above application instance, the payment client and the payment server complete apparatus discovery, authentication, establishing of secure communication channel and initialization of payment transaction security parameter by steps (1)-(4) in the secure payment transaction application based on 3GPP ProSe communication channel as described above. Then, the data transmission between the payment client and the payment server is performed on the established secure channel.

Next, the purchaser autonomously generates the transaction ID by scanning the barcode on the goods on the TV screen and sends the same to the payment server though an operator network, for example, through short message, telephone or the like.

Then, the payment server confirms the transaction ID and the transaction amount, and returns transaction confirmation information to the payment client.

Finally, the payment client confirms the payment information and authorizes a telephone charge account of the operator to pay.

As can be seen, according to the application examples described above, according to the technology of the disclosure, by utilizing the location-based service to implement the mobile secure payment, not only the convenience of payment can be improved, but also protected secure data transmission on the established secure communication channel can be achieved, improving security of data transmission.

Further, it should note that although application examples of the disclosure have been described above with the mobile secure payment application as an example, the technology of the disclosure is not limited thereto, and can also be applied to any application fields requiring secure data transmission, and those skilled in the art may readily modify the above procedure to be applied to other fields according to the principle of the disclosure.

Preferred embodiments of the disclosure have been described above with reference to the drawings, but the disclosure is not limited to the above examples of course. Those skilled in the art may devise various alternations and modifications within the scope of the appended claims, and it should understand that these alternations and modifications would naturally fall within the technical scope of the disclosure.

For example, multiple functions included in one unit in the above embodiments may be implemented by separate devices. Alternatively, multiple functions implemented by multiple units in the above embodiments may be implemented by separate devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. A device, comprising:
processing circuitry configured to
establish a secure communication channel between a first apparatus and a second apparatus;
extract a channel key from the secure communication channel;
generate a data security key for protecting service data based on at least the extracted channel key;
protect the service data using the generated data security key;
generate cipher text data from the protected service data using the extracted channel key; and
transmit the generated cipher text data on the secure communication channel.

2. The device according to claim 1, wherein
the processing circuitry is further configured to generate a service classification parameter based on a type of the service data,
the service classification parameter indicates one or more of an algorithm for generating the data security key and a key length of the data security key, and
the processing circuitry is further configured to generate the data security key based on the service classification parameter.

3. The device according to claim 2, wherein the processing circuitry is further configured to generate the service classification parameter based on authentication information inputted by a user for an authentication process to send the service data.

4. The device according to claim 2, wherein the type of the service data comprises payment data.

5. The device according to claim 4, wherein the first apparatus is a mobile payment client, and the second apparatus is a mobile payment server.

6. The device according to claim 1, wherein the data security key comprises one or more of a verification key protecting verifiability, an encryption and decryption key protecting data confidentiality and an integrity key protecting data integrity.

7. The device according to claim 1, wherein
the device is the first apparatus, and
the processing circuitry is further configured to:
send a connection request to a corresponding second apparatus among a plurality of second apparatuses based on location information; and
establish the secure communication channel according to a response to the connection request from the corresponding second apparatus.

8. The device according to claim 7, wherein the processing circuitry is further configured to reselect, according to a predetermined triggering condition, the corresponding second apparatus from the plurality of second apparatuses based on the location information to send the connection request.

9. The device according to claim 7, wherein the processing circuitry is further configured to select, using a preset list, the corresponding second apparatus from the plurality of second apparatuses to send the connection request.

10. The device according to claim 1, wherein the processing circuitry is configured to establish the secure communication channel between the first apparatus and the second apparatus using a location-based service.

11. The device according to claim 10, wherein the location-based service is Proximity-based Service (ProSe).

12. The device according to claim 1, wherein the channel key is a ProSe traffic key (PTK).

13. The device according to claim 12, wherein the processing circuitry is further configured to generate the data security key according to apparatus information of the first apparatus and the second apparatus.

14. The device according to claim 1, wherein the channel key is a WiFi key.

15. The device according to claim 1, wherein the processing circuitry is further configured to generate the data security key according to a Service Set ID (SSID).

16. A device, comprising:
processing circuitry configured to
establish, in response to a connection request from a first apparatus, a secure communication channel between the first apparatus and a second apparatus;
protect service data using a data security key;
generate cipher text data from the protected service data using a channel key; and
transmit the generated cipher text data on the secure communication channel, wherein
the channel key is extracted by the first apparatus from the secure communication channel,
the data security key is generated by the first apparatus based on at least the channel key extracted from the secure communication channel.

17. The device according to claim 16, wherein the first apparatus is a mobile payment client, and the second apparatus is a mobile payment server.

18. The device according to claim 16, wherein the channel key is a ProSe traffic key (PTK).

19. The device according to claim 16, wherein the channel key is a WiFi key.

20. A communication system, comprising:
a first apparatus including first processing circuitry configured to:
establish a secure communication channel with a second apparatus, extract a channel key from the secure communication channel,
generate a data security key for protecting service data based on at least the extracted channel key,
protect the service data using the generated data security key,
generate cipher text data from the protected service data using the extracted channel key, and
transmit the generated cipher text data to the second apparatus on the secure communication channel; and the second apparatus including second processing circuitry configured to:
establish, in response to a connection request from the first apparatus, the secure communication channel with the first apparatus, and
receive the generated cipher text data from the first apparatus.

21. A method, comprising:
establishing, using processing circuitry, a secure communication channel between a first apparatus and a second apparatus;
extracting a channel key from the secure communication channel;
generating a data security key for protecting service data based on at least the extracted channel key;
protecting the service data using the generated data security key;
generating cipher text data from the protected service data using the extracted channel key; and
transmitting the generated cipher text data on the secure communication channel.

22. A non-transitory computer readable medium including executable instructions, which when executed by a computer cause the computer to:
establish a secure communication channel between a first apparatus and a second apparatus;
extract a channel key from the secure communication channel;
generate a data security key for protecting service data based on at least the extracted channel key;
protect the service data using the generated data security key;
generate cipher text data from the protected service data using the extracted channel key; and
transmit the generated cipher text data on the secure communication channel.

* * * * *